United States Patent [19]
Ninagawa

[11] Patent Number: 6,075,467
[45] Date of Patent: Jun. 13, 2000

[54] MAP DATA SELECTION SUPPORTING DEVICE, AND MAP DATA PROCESSING SYSTEM AND MAP DATA PROCESSING DEVICE INCLUDING THE SAME

[75] Inventor: Yuji Ninagawa, Susono, Japan

[73] Assignee: Toyota Jidosha Kabushiki Kaisha, Aichi-ken, Japan

[21] Appl. No.: 09/134,431

[22] Filed: Aug. 14, 1998

[30] Foreign Application Priority Data

Aug. 21, 1997 [JP] Japan ..................................... 9-225190

[51] Int. Cl.⁷ ................................................... G08G 1/123
[52] U.S. Cl. .......................... 340/995; 340/990; 701/212; 701/213; 702/150; 707/200; 395/161; 395/617; 345/146
[58] Field of Search ..................................... 340/995, 990; 701/212, 213; 702/150; 707/200; 395/161, 617; 345/146

[56] References Cited

U.S. PATENT DOCUMENTS

| | | | |
|---|---|---|---|
| 4,504,913 | 3/1985 | Miura et al. | 701/212 |
| 5,524,202 | 6/1996 | Yokohama | 395/161 |
| 5,596,500 | 1/1997 | Sprague et al. | 701/213 |
| 5,614,895 | 3/1997 | Ohomori et al. | 340/995 |
| 5,635,953 | 6/1997 | Hayami et al. | 345/146 |
| 5,682,525 | 10/1997 | Bouve et al. | 395/614 |
| 5,684,989 | 11/1997 | Nissato | 395/617 |
| 5,699,255 | 12/1997 | Ellis et al. | 701/212 |
| 5,796,634 | 8/1998 | Craport et al. | 702/150 |
| 5,802,492 | 9/1998 | DeLorme et al. | 701/200 |
| 5,893,113 | 4/1999 | McGrath et al. | 707/200 |

FOREIGN PATENT DOCUMENTS

| | | |
|---|---|---|
| 3842179 A1 | 6/1989 | Germany . |
| 195 27 786 A1 | 8/1996 | Germany . |
| 195 44 157 A1 | 5/1997 | Germany . |
| 6-266997 | 9/1994 | Japan . |
| 7-262493 | 10/1995 | Japan . |

Primary Examiner—Benjamin C. Lee
Attorney, Agent, or Firm—Finnegan, Henderson, Farabow, Garrett & Dunner, L.L.P.

[57] ABSTRACT

A terminal device has a controller and a memory medium. The controller receives the latest map data from an information center to update map data stored in the memory medium. For updating, a user selects map data to be updated from map data groups by designating a selection condition via an input device. Selection condition concern "location," "area (area size)," and "scale." After map data which meets the designated condition is selected, the controller updates the selected map data. With the above arrangement, a selection operation is simplified. Also, the controller determines "area" and "scale" candidates (defaults) and recommends them to the user by displaying them in a display. The candidates are determined such that the total volume of selected map data falls within a predetermined volume. Looking at the displayed candidates, the user easily set appropriate selection conditions.

8 Claims, 18 Drawing Sheets

400m SCALE

200m SCALE

100m SCALE

| MAP TYPE | 100m SCALE |
|---|---|
| MAP NO. | 35 |
| MAP UPDATING DATE | JUNE 1, 1999 |
| DATA FILE NAME | S100_0035. map |
| DATA FILE SIZE | 1900 byte |

MAP DATA HEADER INFORMATION

Fig. 3

FLOWCHART OF MAP DATA CLEARANCE PROCESSING

MAP DATA CLEARANCE MENU

| MAP TYPE | 100m SCALE |
|---|---|
| MAP NO. | 35 |
| MAP UPDATING DATE | JUNE 1, 1999 |
| DATA FILE NAME | S100_0035. map |
| DATA FILE SIZE | 1900 byte |
| ASSOCIATED UPDATING DATE | DEC 25, 2000 |

MAP DATA HEADER INFORMATION

Fig. 17

MAP DATA SELECTION SUPPORTING DEVICE, AND MAP DATA PROCESSING SYSTEM AND MAP DATA PROCESSING DEVICE INCLUDING THE SAME

BACKGROUND OF THE INVENTION

1. Field of the Invention

The present invention generally relates to a map data selection supporting device, and more particularly to a device which helps a user more easily select desired map data from a map data group. The present invention also relates to a map data processing system which incorporates the map data selection supporting device of the present invention. The map data processing system comprises an information center and a terminal device. The information center and the terminal device are connected to each other via a communication means so that the former sends the latest map data to the latter. Using the latest map data, the terminal device updates map data stored therein.

The present invention is particularly applicable to a map data processing system in which a terminal device is mounted on a moving body. In the following, a vehicle will be taken as an example of a moving body.

2. Description of the Related Art

The use of map data inside a moving body has become more popular as navigation systems have spread. In order to use map data inside a vehicle, the vehicle must carry a map data storing device for storing map data. Map data concerning areas around a present or destination position is read from the device and displayed. In the storing device is also stored map data to be used in searching for an optimum route from the present position to the destination position, and in map-matching for detecting the precise present position.

A conventional map data storing device generally requires a large capacity memory medium, such as a CD-ROM, on which is stored fixed map data. In order to update the stored data, the entire medium must be exchanged.

Meanwhile, a data communication systems have been developed. In the most common system, a vehicle communicates with an information center via a communication means. Typical examples of such a system are Vehicle Information and Communication System (VICS) and Intelligent Transport System (ITS).

Accompanying the development of such a data communication system, a map data processing system (a maintenance system) has also been proposed, in which map data held on a vehicle side is updated utilizing data communication. Specifically, a terminal device mounted on a vehicle carries a read/write map data storing device (medium), and updates the map data held in the storing device using the latest map data obtained from an information center. With this system, a user can access the latest map data without exchanging a CD-ROM. One example of the above system is disclosed by Japanese Patent Laid-Open No. Hei 7-262493.

In general, a number of maps on different reduced scales are available in such a map data processing system. There are a number of divided smaller sectional maps for each scale, and map data is stored for each sectional map. That is, the map data storing device stores map data of maps with a large coverage in the form of a collection of sectional map data (a map data group).

In a map data updating process using data communication, sectional map data is individually processed. This advantageously enables to update desired sectional map data only, though it disadvantageously leaves updated map data in different versions stored disorderly in a map data storing device. It is difficult for a user to manage and update as necessary map data stored in such a condition, especially if the vehicle operator is not well accustomed to data management as a user of a general-purpose personal computer. Further, management of map data of a large volume may be difficult to perform by operating such a device that is generally equipped to a vehicle with a limited inside space. Considering the above, it is not preferable that a user be required to follow a complicated procedure. Therefore, a simpler process for managing and updating map data has been desired. Otherwise, the following problems, for example, will be expected.

(i) In a map data updating process, in order to exploit the advantage of individual updating of sectional map data, a user is required to select desired sectional map data to be updated (updating map data) from a map data group. The selected map data is rendered into subsequent process. To help the user's selection, a map data selection supporting device is provided. In this device, when a user designates a selection condition (parameter), sectional map data which meet the parameter is selected from a map data group stored in the map data storing device. A selection condition must be distinct enough to specify particular sectional map data.

With a conventional device, such as the one disclosed in the above JP Laid-open No. Hei 7-262493, a user is required to select at least "region" as a selection condition. Thus, in order to select "region," the user inputs the name of a desired regional unit, such as a prefecture in Japan or a state or city in the U.S.

However, when considering updating a map, a user tends to think of a map to be updated in connection with a particular point. For example, he/she may wish to update a map of areas around his/her present position, his/her home or garage, or a destination. Therefore, conventionally, the user must first judge which area, or a regional unit, includes the particular point in mind in order to designate appropriate "region." Making such judgement, however, may be troublesome. Worse, the user may not always know for sure a correct name of an area or a regional unit which includes a particular point.

(ii) Designation of an improper selection condition may likely lead to the selection of map data having too large or small map data volume. For example, designation of too wide an area causes map data having too large a volume to be selected, while designation of too small an area causes selection of map data having too small volume. A too large data volume may increase a processing load, in particular, a load for communication with an information center. Note that a vehicle may travel in areas with tunnels or overpasses. Such a vehicle may be able to communicate with an information center in a preferable condition, i.e., without disturbance by, for example, a building, for only a limited time due to bad communication condition. Map data having a very large data volume may take a longer time to be fully transmitted than such a limited time which ensures preferable communication condition. On the other hand, selection of map data having too small a data volume is wasteful because the performance of system is not fully utilized.

In order to avoid these problems, a user is required to designate a selection condition that leads to selection of map data having an appropriate data volume. This, however, is difficult for a user to achieve as he/she may not be sufficiently informed to make a judgement concerning data volume.

(iii) Conventionally, a user has no way to know the current status in terms of newness of map data corresponding to a selection condition which he/she intends to input via a selection supporting device. That is, it may often be a case that selected map data has already been updated partly or entirely. Therefore, it has conventionally been difficult for a user to designate an appropriate selection condition due to lack of information.

SUMMARY OF THE INVENTION

The present invention has been conceived to overcome the above problem and aims to provide a map data selection supporting device which helps a user easily and reliably select desired map data from a map data group stored in a map data storing device. The present invention further aims to provide a map data processing system which incorporates such map data selection supporting device.

In order to achieve the above object, according to one aspect of the present invention, there is provided a map data selection supporting device for supporting an operation of selecting desired map data from a map data group, comprising map data storing means for storing the map data group; location designation means for designating a desired location; area designation means for designating a desired area size; scale designation means for designating a desired map scale; and selection means for selecting, from the map data group, map data at the map scale designated covering the location designated and the area size designated.

In the above, scales may be designated one by one, or a number of scales may be collectively designated, as in the second embodiment of this invention to be described later.

In this invention, a user designates a location, an area size, and a scale. According to these three selection conditions (parameters), map data to be selected are specified. That is, a region in the designated size including the designated location is specified, and map data of a map which covers the specified region is selected. A user can freely determine any point whose map data he/she believes requires updating, and designates that point and other selection conditions. In other words, the user need not make troublesome judgement as to which area or a regional unit includes a particular point. Rather, the user can easily select desired map data, based on the particular point in mind itself, without considering the correlation between the desired point and it surrounding region.

Also, when the area designation means designates an area size, the scale designation means determines candidate map scale, based on the designated area size, such that map data to be selected by the selection means has a predetermined volume. The determined candidate map scale is recommended to a user. A "data volume" means the total data volume of a number of selected map data. "A predetermined value" may be a specific value or range.

In this invention, the total data volume of selected map data is determined mainly depending on a map area size and a map scale. To be specific, with an area size determined, the total data volume of map data to be selected may change according to a map scale. Therefore, candidate scale is determined such that map data to be selected has a predetermined data volume. The determined candidate scale is recommended to a user. For recommendation, preferably, a default scale may be presented to the user. After learning the candidate scale, the user can permit the appropriate candidate scale, or amend the previously designated area size.

Similar to the above, when the scale designation means designates a scale, the area size designation means determines a candidate map area size, based on the designated area size, such that map data to be selected by the selection means has a predetermined volume, and the determined candidate area size is recommended to a user. The principle and advantage of this arrangement are identical to those which were described above with the scale designation means. Once informed of a candidate area size, the user can permit the appropriate candidate area size, or amend the scale already designated.

According to another aspect of the present invention, there is provided a map data processing system, comprising a terminal device having terminal map data storing means storing a map data group; an information center connected to the terminal device via communication means and comparing center map data storing means storing a group of latest map data; the terminal device including designation means for designating a desired location, a desired area size, and a desired map scale, selection means for selecting from the map data group stored in the terminal map data storing means, map data at the map scale designated covering the location designated and the area size designated, comparison means for comparing the chronological order of the map data selected and corresponding map data stored in the center map data storing means, and display means for displaying the results of comparison so that a user acknowledges the result.

In this aspect, similar to the first aspect, a desired map data can be easily selected through designation of the three elements, namely, location, area size, and scale. Further, looking at the displayed information, the user can easily understand the present condition of map data corresponding to the designated three elements. That is, the user can easily know the present state of map data corresponding to a selection condition he/she intends to designate. In particular, he/she can easily know whether or not that map data has already been updated. Based on this knowledge, the user can set an appropriate selection condition.

According to yet another aspect of the present invention, there is provided a map data processing device mounted on a terminal device having terminal map data storing means storing a map data group, comprising designation means for designating a desired location, a desired area size, and a desired map scale; selection means for selecting from the map data group stored in the terminal map data storing means, map data on the map scale designated covering the location designated and the area size designated; communication means for communicating with an information center, the center having center map data storing means storing a latest map data group; comparison means for comparing the chronological order of the map data selected and corresponding map data stored in the center map data storing means using the communication means; and display means for displaying the result of comparison so that a user acknowledges the result.

This arrangement can also offer the same advantage as that of the map data processing system mentioned earlier.

As described above, according to the present invention, a user's operation in connection with map data processing is made simpler and more reliable. This in turn makes it possible to further utilize the advantage that the latest map data is provided to a terminal via data communication.

BRIEF DESCRIPTION OF THE DRAWINGS

The above and other objects, features, and advantages, will become further apparent from the following description of the preferred embodiment taken in conjunction with the accompanying drawings wherein:

FIG. 3 is a table showing header information items included in a header part of map data;

FIG. 17 is a table showing header information items included in a header part of map data according to the second preferred embodiment;

DESCRIPTION OF THE PREFERRED EMBODIMENTS

Preferred embodiment of the present invention will next be described with reference to the accompanying drawings.

Embodiment 1

Figure 1:
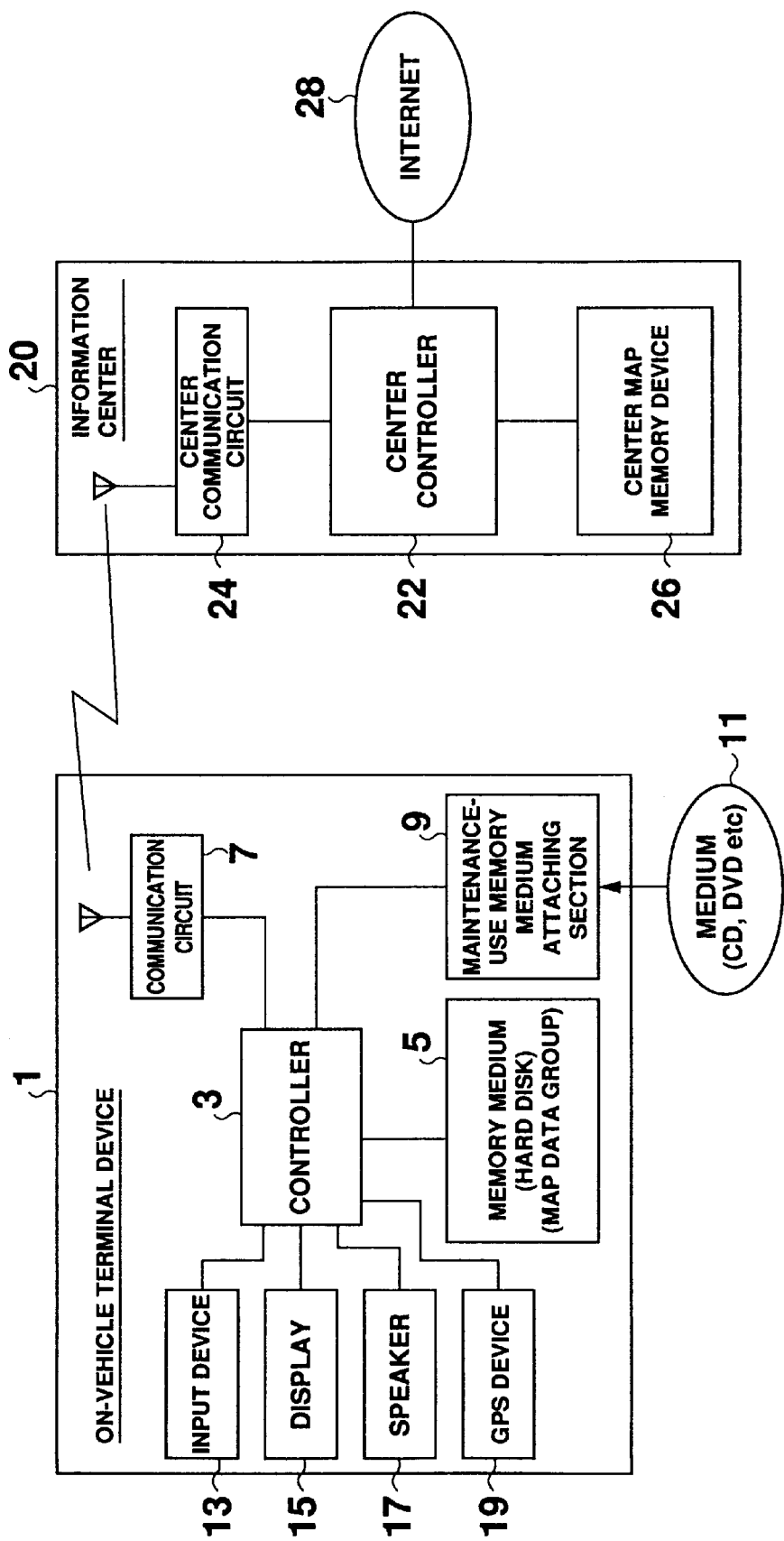
FIG. 1 is a block diagram showing a complete structure of a first preferred embodiment of the present invention.

Referring to the complete structure of a map data processing system of this embodiment shown in FIG. 1, a map data processing system of this embodiment comprises a terminal device 1 and an information center 20. The terminal device 1 is generally mounted on a vehicle. The information center carries out data communication individually with a number of terminal devices 1 on vehicles. The information center is an infrastructure.

A map data selection supporting device of this invention is integrally formed on a terminal device 1. The terminal device 1 generally serves as a navigation device utilizing the map data.

The terminal device 1 has a controller 3 which is responsible for comprehensive control over the device 1. The controller 3 is connected to a memory device 5 for storing map data, which is a read-write hard disk device in this invention and may also be any other memory device. The controller 3 is also responsible for maintenance of the map data stored in the device 5 through processes of "map data confirmation," "map data update," and "map data clearance" (described later).

The controller 3 is connected also to a communication circuit 7. The controller 3 obtains various information or data necessary for map data maintenance or updating from the information center 20 via data communication using the communication circuit 7. The controller 3 writes the obtained information or data into the memory device 5 to thereby update the map data stored therein.

The controller 3 is further connected to a maintenance-use memory medium attaching section 9 for receiving a medium 11 (CD-ROM, DVD, or the like) which stores the latest map data to be used for maintenance. The controller 3 is able to update the map data in the memory medium 5, using the latest map data in the medium 11.

The controller 3 is still further connected to an input device 13, a display 15, and a speaker 17. The input device 13 includes a joy stick, a switch, and an audio recognizer for recognizing user's voice. A user can input various instructions for data maintenance via the input device 13. A display 15 shows various screen images related to a data maintenance process. For example, the display 15 shows an application menu including selectable items, under the control of the controller 3, so that a user can select a desired alternative for each item to thereby input an instruction. The display 15 additionally shows explanations and guidance for a maintenance process, which also may be outputted as an audio via the speaker 17.

The controller 3 is also connected to a GPS device 19 for detecting the present position of a vehicle by utilizing electric waves transmitted from a man-made satellite, and sending the information to the controller 3. As a modification, present position detectors of any other types may be employed instead, which are generally used for satellite navigation, self-contained navigation, electric navigation, and so forth, or combination thereof. The obtained present position information is used by the controller 3 mainly when it serves as a navigation device, or for map data maintenance.

Referring to FIG. 2, map data stored in the memory medium 5 will be described.

The memory medium 5 stores map data of maps on a number of reduced scales, parts of which (maps on 400 m, 200 m, 100 m scales) are shown in FIG. 2. Map data is divided into a number of sectional maps. One map A (400 m scale) accompanies four maps a-d (200 m scale), each of which in turn accompanies sixteen maps a1-d4 (100 m scale). In other words, the memory medium 5 stores map data of maps on different scales with a wide coverage, divided into a number of sectional map data. Each sectional map data has a header part which includes header information items, such as a map type (scale), a map number, a map updating date, a file name of map data, and a file size, as shown in FIG. 3.

Referring again to FIG. 1, the information center 20 will be described.

The information center 20 comprises a center controller 22, a center communication circuit 24, and a center map data storing device 26. The center controller 22, which is responsible for comprehensive control over the information center 20, carries out data communication with an on-vehicle terminal device 1 using the center communication circuit 24. The controller 22 is connected to the center map data storing device 26 for storing map data in a similar data architecture as that in the memory medium 5 on the vehicle side. The center controller 22 always attempts to acquire the latest map data externally, for example, via the Internet 28 or any other means, so that it is always the latest map data that is stored in the center map data storing device 26.

The center controller 22 retrieves, in response to the vehicle's request for map data, the requested map data from the center map data storing device 26, and sends it to the requesting vehicle, using the center communication circuit 24. The center controller 22 reads, if requested, header information of map data, rather than map data itself, from the storing device 26, and sends it to the requesting terminal device 1. Preferably, for use in this process, a separate file may be prepared in advance which includes header information only. Transmission of header information may take only a short time as substantial map data is not transmitted. On the vehicle side, it is possible to make a judgement concerning an updating date or a data volume of a desired map, referring to the received header information.

Next, a map data maintenance process will be described in the order of "complete operation process," "map data confirmation," "map data update," "map data clearance," and "automatic maintenance setting".

Complete Operation Process

Figure 4:
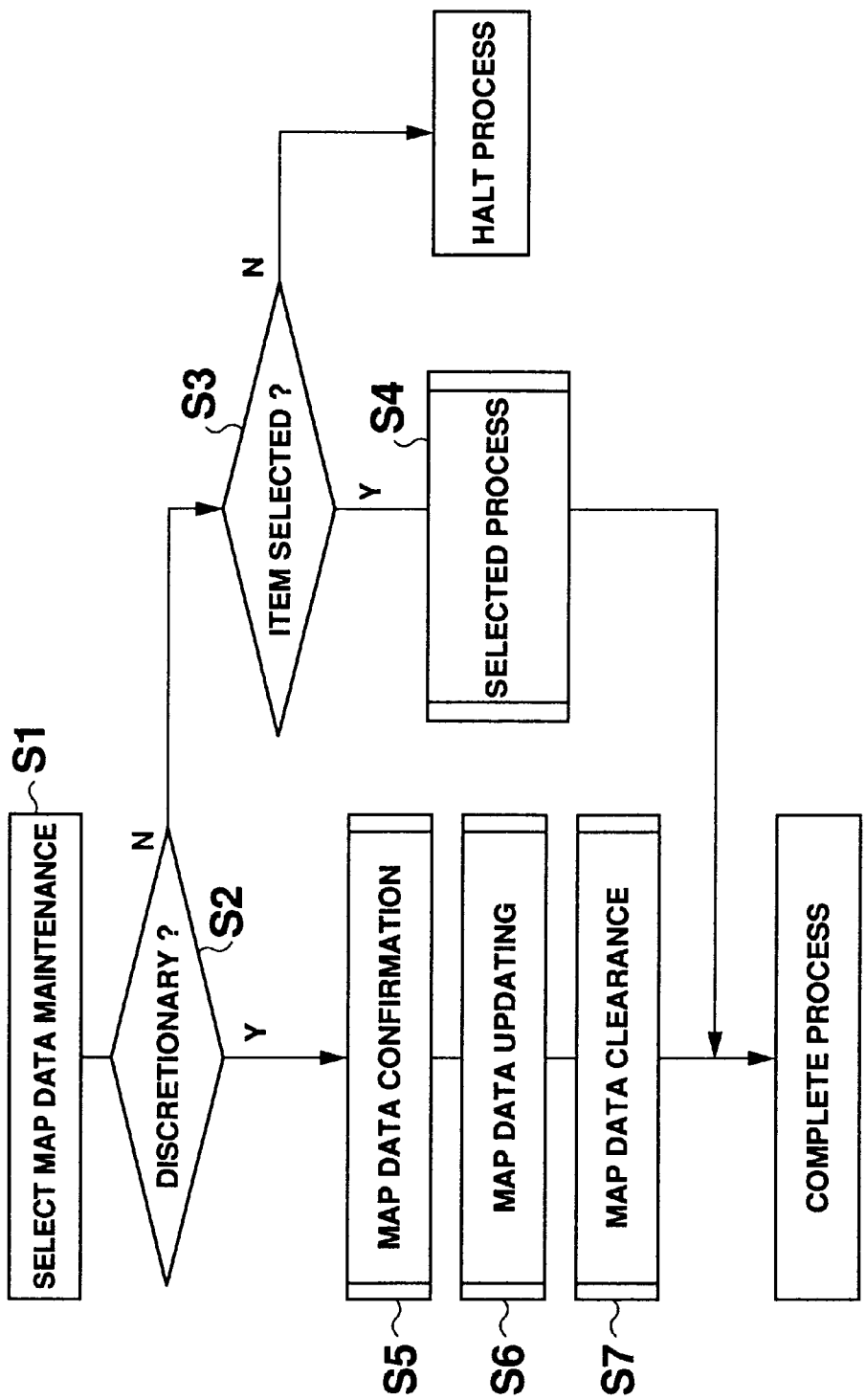
FIG. 4 is a flowchart of a complete operation process of the system shown in FIG. 1.
Figure 5:
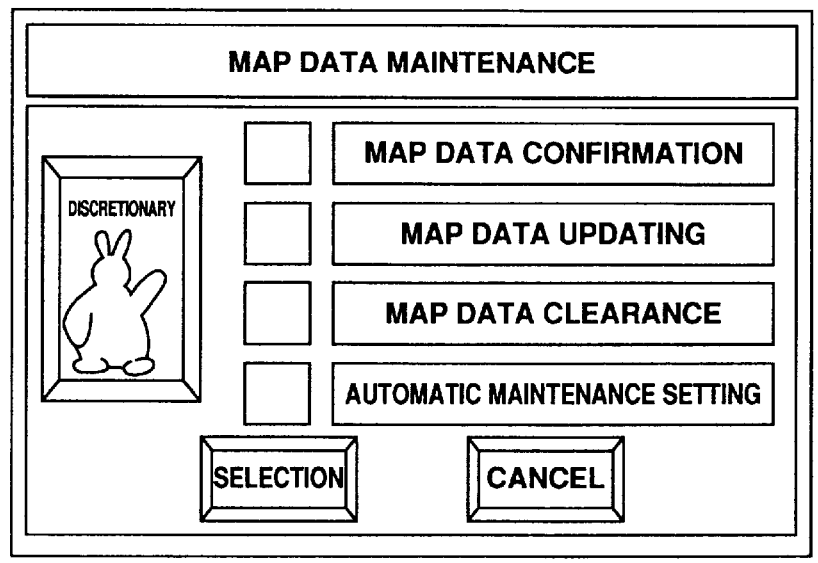
FIG. 5 is a diagram showing a screen image initially displayed in a maintenance process.

Referring to the flowchart shown in FIG. 4, when a user selects "map maintenance" in the application menu shown in the display 15, the screen image of FIG. 5 appears in the display 15 (S1), so that the user can select a desired item among the displayed items, using the input device 13. With an item selected, the controller 3 detects whether or not "discretionary" was selected (S2). If not, the controller 3 detects whether or not any of "map data confirmation," "map data update," "map data clearance," and "automatic maintenance setting" was selected (S3). If it was, a relevant process is started (S4). Respective processes will be described later. If "cancel" was selected (S3), the operation process is then halted.

Returning at S2, with "discretionary" selected, the controller 3 sequentially carries out the processes of "map data confirmation (S5)," "map data update (S6)," and "map data clearance (S7)" in a batch-like manner. A "discretionary" course is a system's recommendation, in which respective processes are sequentially carried out by the controller 3 with explanations about the processes or inquiries of necessary information made to a user via the display 15 or speaker 17. Specifically, an agent (a character) shown in FIG. 5 appears in the display 15 under the control of the controller 3, offering guidance for the processes. Respective icons also appearing in the display 15 and/or audio guidance are set in accordance with the movement of the agent.

Map Data Confirmation

Figure 6:
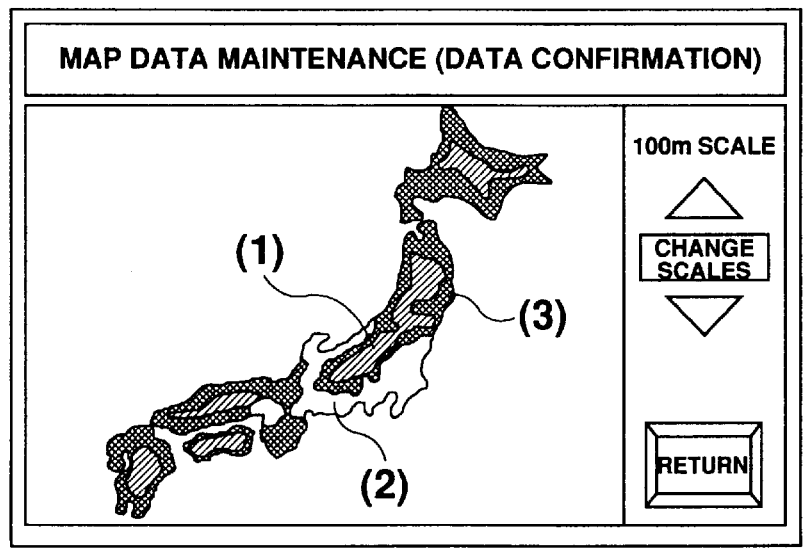
FIG. 6 is a diagram showing a screen image displayed for "map data confirmation;"

"Map data confirmation" is a tool for displaying map data stored in the memory medium 5 of the terminal device 1, such that areas with and without the latest map data are distinguished from each other as shown in FIG. 6.

A user may select a desired scale of map data to be confirmed. With the selection, map data on the selected scale is displayed in the form of a map such that areas with and without the latest map data are discriminated from each other. Specifically, areas of the following three-types are discriminated by means of, for example, coloring so that the user can easily tell areas which require updating, while referring to the displayed map.

(1) areas without map data (map data are not supplied to or down-loaded by a vehicle);

(2) areas with older map data (the latest map data is available with the information center 20 or the medium 11); and (3) areas with the latest map data stored in the memory medium 5 (not requiring maintenance).

Figure 7:
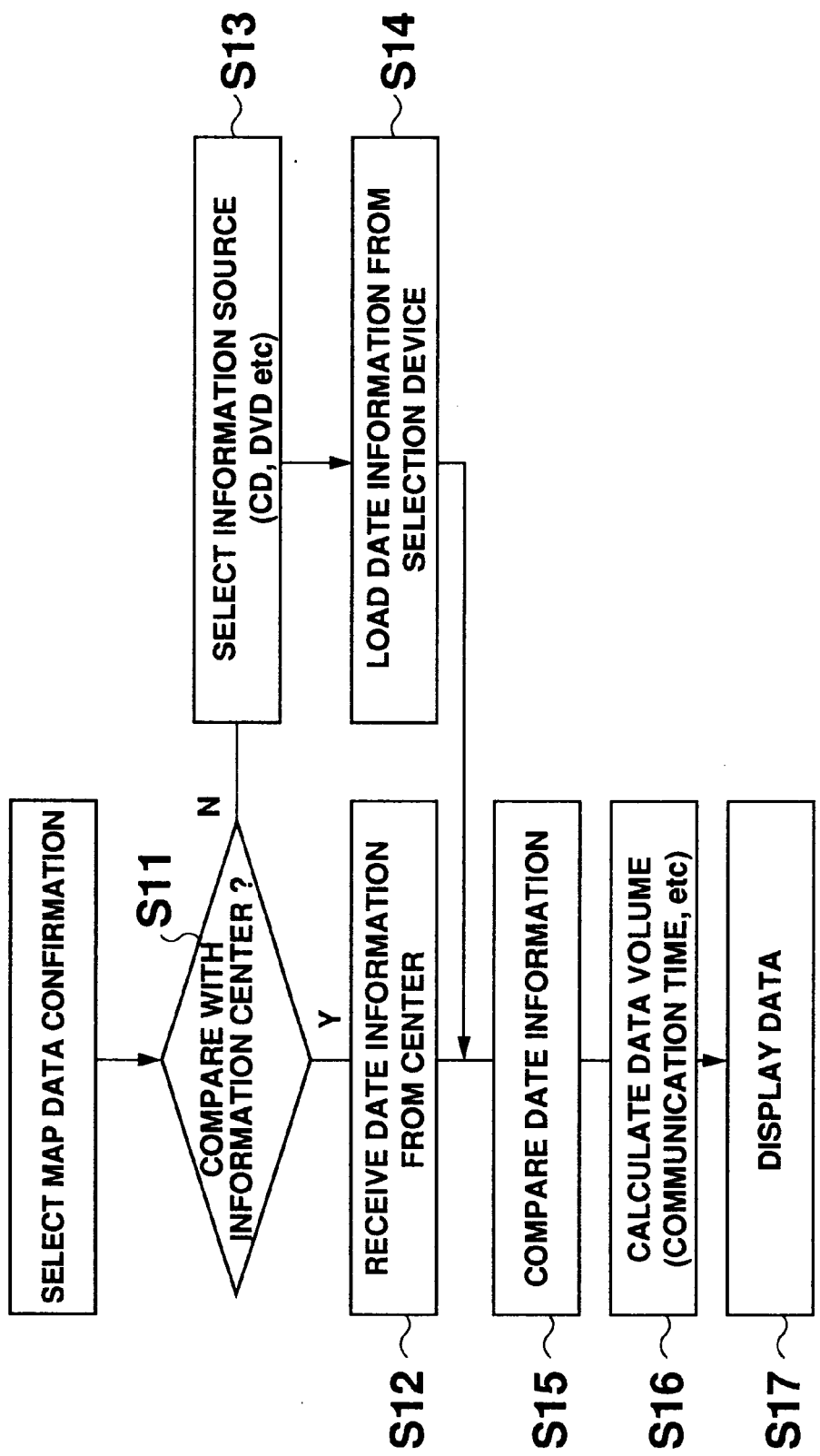
FIG. 7 is a flowchart of a "map data confirmation" process.

Referring to the flowchart shown in FIG. 7, a "map data confirmation" process is performed upon user's selection of "map data confirmation" or "discretionary."

In operation, the controller 3 encourages the user to select either an information center or a medium as an information source for comparison for confirmation (S11).

With an information center selected, the controller 3 initiates data communication with the information center 20, using the communication circuit 7. Through the data communication, the controller 3 asks the information center 20 for the information concerning the latest updating date of map data held in the center 20. In actuality, the controller 3 asks for the transmission of header information as it includes updating date information. In response to the request, the center controller 22 retrieves relevant header information from the center map data storing device 26, and sends it to the requesting vehicle, using the center communication circuit 24 (S12).

The controller 3 on the vehicle side then reads header information of map data at issue from the memory medium 5, and at S15 compares corresponding map data read from the memory medium 5 and obtained from the information center 20. In this comparison, updating dates of "the same map data" are compared (S15). "The same map data" means map data on the same scale with the same coverage. This comparison will prove whether or not the map data in the memory medium 5 is of the same version as that of the corresponding map data held in the information center 20, i.e., the latest version.

Referring to a "file data size" in the header information, the controller 3 calculates the volume of older map data stored in the memory medium 5 for every scale (S16). Also, a time period necessary for the transmission of map data having the calculated data volume may be calculated at S16.

With the comparison completed at S15, the controller 3 controls the display 15 so as to display the comparison result in the form of a map, as shown in FIG. 6, along with the results of the calculation made at S16 (S17). For display, the user can select a desired scale so that comparison results concerning the map on the selected scale are displayed.

Returning to S11, provide that a medium is selected. The controller 3 encourages the user to specify the type of a medium (CD-ROM, DVD, and so on) (S13). The user attaches the medium to the maintenance-use medium attaching section 9 so that header information of map data in the medium 11 is loaded to the controller 3 (S14). Subsequently, identical processes to those described above are performed (S15 to S17).

Alternatively, header information may be supplied to the terminal device 1 by means of FM multi-channel broadcasting or satellite broadcasting, so that the header information received by a broadcasting receiver mounted on a vehicle is used in subsequent processes as described above. In this alternation, header information which is necessary for a map data maintenance process, rather than map data itself, is supplied via broadcasting. This alternation may be similarly applicable to a map data updating process (described below).

Map Data Updating

Figure 8:
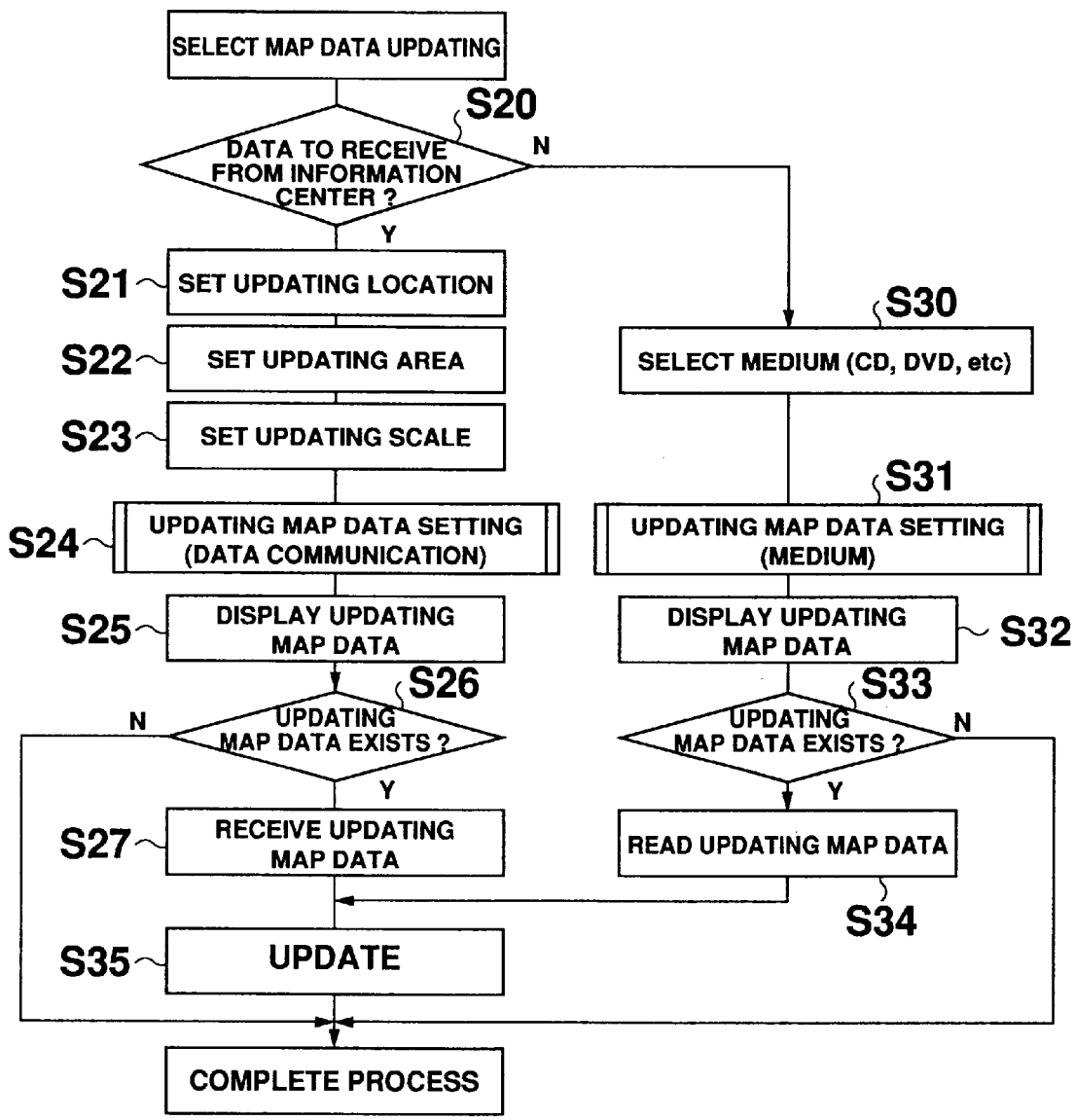
FIG. 8 is a flowchart of a "map data updating" process.

Referring to the flowchart shown in FIG. 8, a "map data updating" process is carried out upon selection of "map data update" in the application menu shown in FIG. 5 or after a "map data confirmation" process in the "discretionary" course.

In operation, the controller 3 encourages the user to select either an information center or a medium as a source of the latest information (S20).

Figure 9:
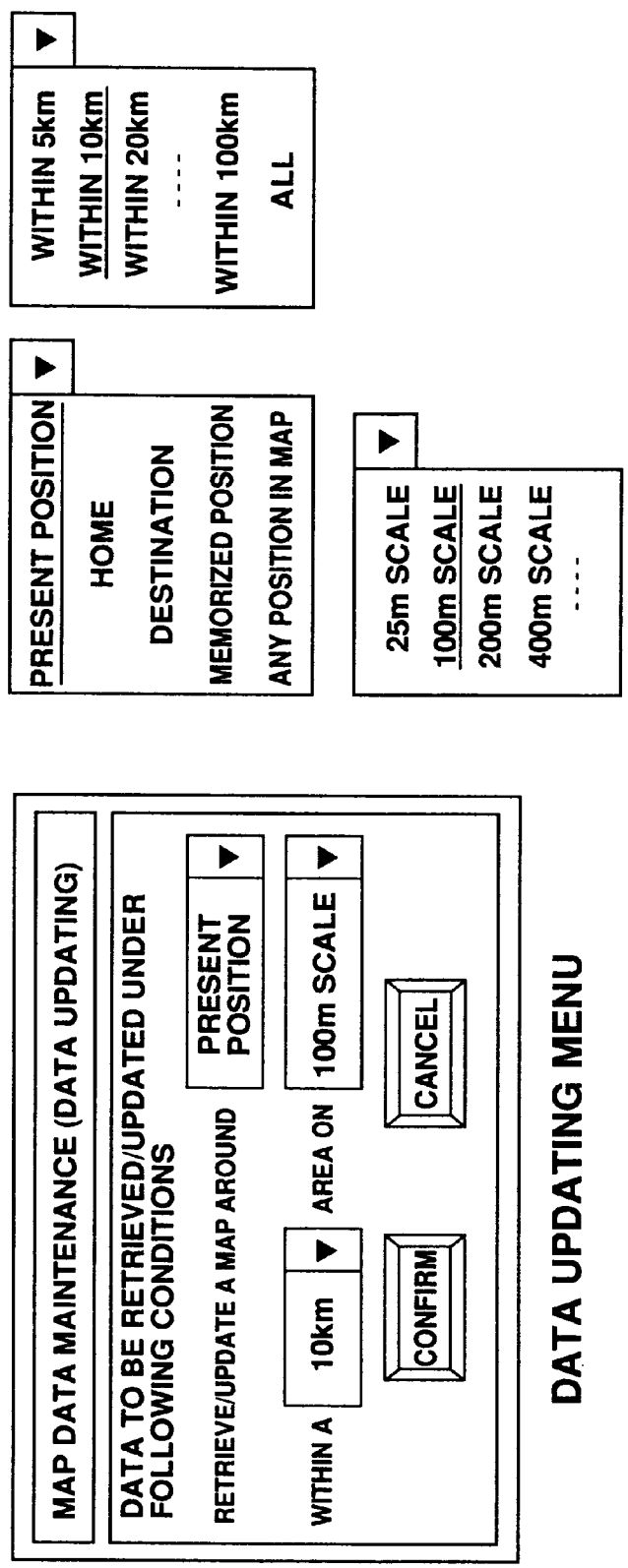
FIG. 9 is a diagram showing a screen image displayed for "map data updating;"

With an information center selected, the screen image of FIG. 9 appears in the display 15. Referring to the image, the user designates each item in the menu, using the input device 13, whereby map data for the subsequent process is selected from those stored in the memory device 5. In this embodiment, the controller 3 serves as a designation means in control of the input device 13, the display 15, and the speaker 17.

That is, items in the menu of FIG. 9, including "location," "area (area size)," and "scale," are provided for designation of a selection condition (a parameter). These items may be specified in any order at S21, S22, S23, respectively. With designation, map data for subsequent processes is selected accordingly.

"Location" refers to the center of a map to be selected, and is selected from "present location," "destination," "memorized location (home, etc.)," and "any location." If "any location" is selected, the user needs to input further information as to a desired location, using the input device 13. A user can designate any desired location whose map data he/she believes requires updating.

"Area" is the size of a map coverage. That is, a region which is partly or entirely covered by a circle having a radius of the designated "area" value, is selected.

"Scale" refers to a reduced map scale.

In short, with the above designation, map data on the designated reduced scale which covers a region around the designated location within the designated area, is selected as meeting the designated selection condition.

Every designation item has a default. The default "location" is "present location;" that of "area" is "10 km;" and that of "scale" is "100 m." These defaults are determined in consideration of the capability of data communication with the information center 20.

As an example, provide that the data communication speed between the terminal device 1 and the information center 20 is 384 kbps, and one sectional map has a 10 kbyte data volume, irrespective of scales. Here, a map on a larger scale has a larger data volume per a unit area but has a smaller coverage, as shown in FIG. 2. Therefore, it is reasonable to assume that any sectional map has a substantially equal data volume, or 10 kbyte, though a 10 kbyte volume may be a little larger in consideration of an actual data volume. Also, provide that three minutes is the longest possible time during which a vehicle can continue data communication without disturbance by, for example, a building. Map data transmittable during three minutes may correspond to approximately 864 sectional maps as calculated as follows:

$$384 \text{ k}/8 \times 60 \times 3/10 \text{ k} = 864$$

Actual communication efficiency may be 70% due to the need of error corrections. In this example, one sectional map on 100 m scale covers a region of 1,000,000 m$^2$, then map data on 100 m scale within 10 km area corresponds to 628 sectional maps. Therefore, the transmitted data amount may be appropriate in view of the number of sectional maps specified by the defaults, 100 m scale and 10 km area size.

Also of note, according to a user's designation of "scale," the default of "area" is changed accordingly so as to maintain a predetermined volume. For example, when "25 m scale" is designated, "area" may be changed to "5 km." A map on 25 m scale covers a region of 250,000 m$^2$. The number of maps corresponding to "25 m scale" and "5 km area size" is 628. On the other hand, if "area" is fist designated, the default of "scale" is changed accordingly. In either case, the default of one parameter will change according to that of the other so that map data to be selected has an appropriate data volume. With this arrangement, a user can easily designate appropriate "area" and "scale."

Further, when the controller 3 serves as a navigation device, the defaults of respective items are determined as follows. That is, while "location" is set at "destination," "area" and "scale" are set according to the distance from the present location to the destination basically. In particular, "area (size)" is determined so as to cover both the present and destination locations, and a larger "scale" is selected for a closer destination. Moreover, the defaults of "area" and "scale" are adjusted so that map data to be selected has an appropriate data volume.

Returning to FIG. 8, when the respective items are designated, the controller 3 selects map data which meet the designated condition, and then chooses map data to be updated (updating map data) from among the selected map data (S24).

Figure 10:
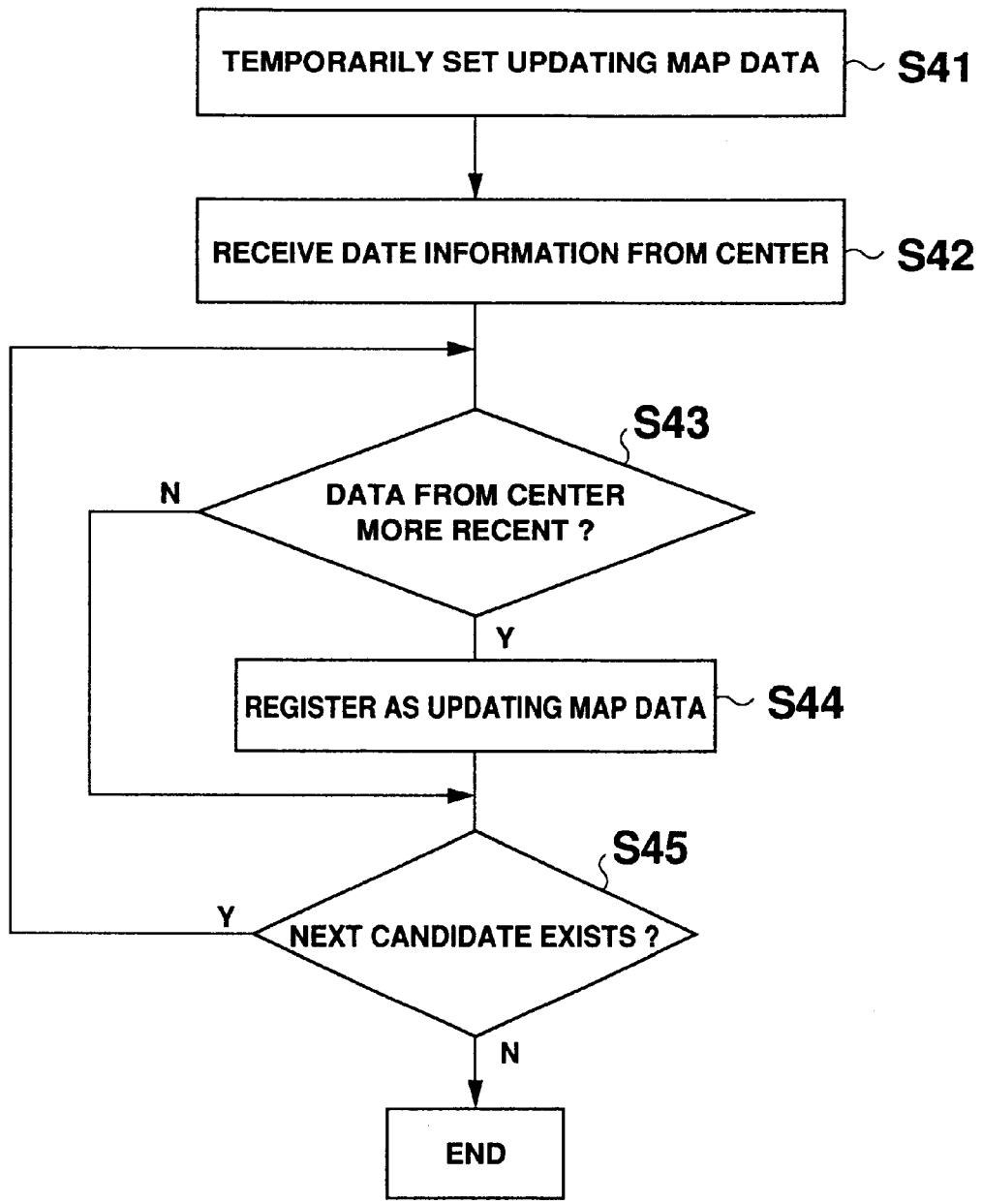
FIG. 10 is a flowchart of a process for setting an updating map data included in the process shown in FIG. 8.

Referring to the flowchart shown in FIG. 10, a process of setting updating map data will be described.

Initially, map data which meet the selection condition designated at S21, S22, S23 are chosen to be temporarily set as candidate updating map data (S41). The controller 3 then acquires date information of the candidate updating map data by acquiring header information thereof from the information center 20 (S42). Specifically, the controller 3 asks the information center 20 for transmission of header information concerning the candidate updating map data, similar to S12 in FIG. 7. In response to the request, the center controller 22 of the information center 20 retrieves relevant header information from the center map data storing device 26, and sends it to the requesting controller 3. In the above, header information alone is requested by the controller 3 and transmitted by the center controller 22.

Subsequently, the controller 3 compares the header information, in particular, the updating date, of candidate updating map data with that of corresponding map data supplied by the information center 20 (S43) in order to detect whether or not the map data from the center 20 has a more recent updating date. If the data is more recent, the compared candidate updating map data on the vehicle side is registered as updating map data (S44). If the data is the same or older, the operation process proceeds to S45, without making registration.

After the controller 3 confirms that no candidate updating map data is left without being compared (S45), the operation process is completed. On the other hand, if any candidate updating map data is left for comparison (S45), the process returns to S43 where the above process is repeatedly performed with the remaining candidates.

After updating map data is all set, referring again to FIG. 8, the set map data is displayed in the form of a map under the control of the controller 3 (S25). The displayed map has the location designated at S21 as its center, and covers the area designated at S22. The displayed map is generally similar to but smaller than the map of FIG. 6. In the displayed map, areas corresponding to the registered updating map data is shown distinguishably from other areas so that the user can know at a glance how much of the map data is set as updating map data (i.e., older map data) among those having been selected as meeting the designated selection condition.

The controller 3 then asks, through the display 15 or the speaker 17, the user for a permission to execute an updating process. At this stage, the user may be able to amend the selection condition designated at S21 to S23 if he/she finds they are inappropriate.

When user permission is obtained, the controller 3 verifies that there exists any updating map data registered (S26). If no data exists, the updating process is halted. If, on the other hand, data exists, the controller 3 sends request indicating map data in need to the information center 20. In response to the request, the center controller 22 retrieves relevant data from the storing device 26, and sends the data to the requesting vehicle. Receiving the data (S27), the controller 3 on the vehicle side writes the received map data into the memory medium 5 to thereby update updating map data stored in the memory medium 5 (S35). A data storage table may also be rewritten, if necessary.

Returning to S20, where an information source is selected, if a medium is selected, the controller 3 encourages the user to specify a medium (such as CD-ROM, DVD) (S30). The user attaches the medium to the maintenance-use memory medium attaching section 9. Then, similar to S24, updating map data selection is begun (S31) At S31, different from S24, all map data (on all scales and with all areas) is set as candidate updating map data for the selection of updating map data because this case is free from the limitation on the communication capability. Then, updating map data is displayed in the display 15 (S32). Then, the user is asked for a permission to execute an updating process. The user decides whether or not to execute the process, looking at displayed maps while switching scales. When permission is granted, the controller 3 retrieves relevant map data from the medium 11, and begins a map data updating process (S35).

In the above, when a medium was selected, all map data is temporarily set as candidate updating map data. Alternatively, "location," "area," and "scale" may be respectively designated at S21 to S23, which would be inserted into between S30 and S31 even when a medium was selected. In this way, only map data which meets the designated condition is set as candidate updating map data, similar to when a data communication is used.

A "map data updating" process may also be carried out when "discretionary" was selected in the application menu. In this case, since updating dates were compared in the "map data confirmation" process, which is generally performed prior to a "map data updating" process in a "discretionary" course, the comparison result obtained during the confirmation process may be used also in setting updating map data at S24 and S31 for the "map data updating" process. This can advantageously avoid double acquisition of the same header information, and thereby simplify data processing.

Also preferably, displaying of updating map data at S25 and S32 may accompany displaying of other useful information, such as the total data volume of updating map data or a data communication time calculated as necessary to transmit map data having the calculated data volume. Information on updating expenses may also preferably be displayed when data provision or communication is charged so that the user can update indispensable map data only.

Map Data Clearance

Figure 11:
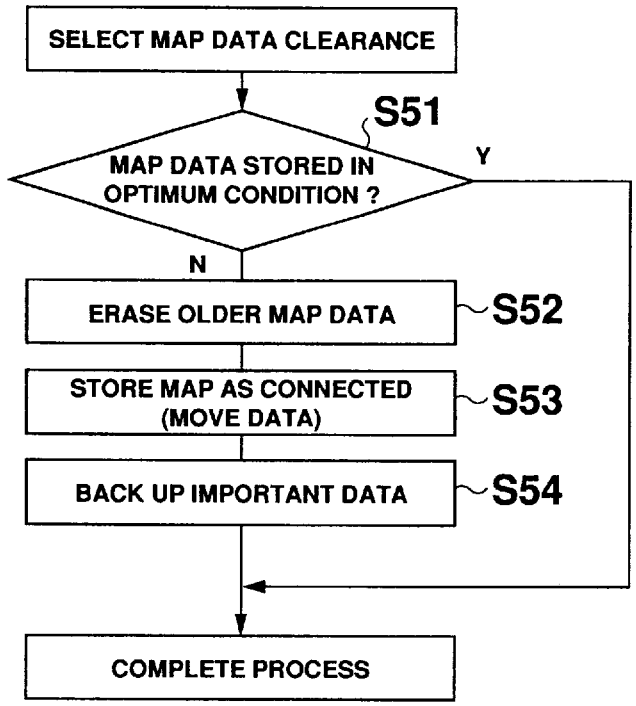
FIG. 11 is a flowchart of a "map data clearance" process.

Referring to the flowchart shown in FIG. 11, a "map data clearance" process is carried out upon selection of "map data clearance" in the application menu shown in FIG. 5, or after the "map data updating" process in the "discretionary" course.

Figure 12:
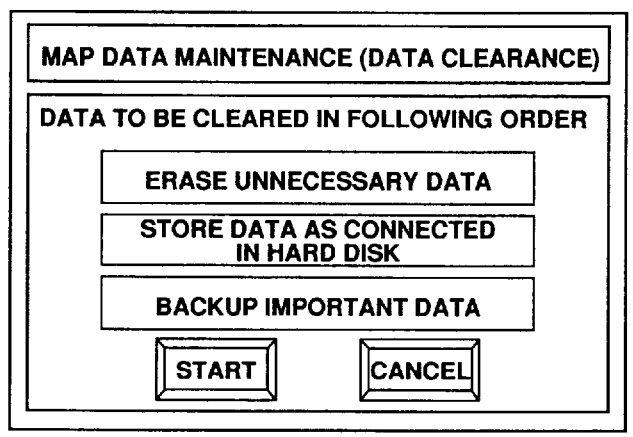
FIG. 12 is a diagram showing a screen image displayed for "map data clearance;"

In operation, the controller 3 controls the display 15 so as to display the screen image shown in FIG. 12. After the respective processes are explained, a user's permission to start the process is asked for. If the user selects "cancel," the operation process is halted. If the user selects "start," on the other hand, the operation process proceeds to S51, where the controller 3 judges as to whether or not map data in the memory device 5 is kept in the optimum state. Positive judgement will be made in the case that the last map data updating process was performed before the last map data clearance process, and negative judgement will be made if otherwise. In the former case, the operation process is completed. In the latter case, unnecessary data (older data remaining after updating) is deleted (S52), and the map data stored in the hard disk are rearranged to be stored orderly connected to one another (S53). With this arrangement, map data can be effectively read for navigation. Moreover, important data is backed up (S54). Important data may include map data concerning areas around home or a specific location memorized, or any data obtained via data communication or during a predetermined past period, such as within three months. Backup data may be made through data duplication or any other means, and may be stored in compressed form.

Older data is overwritten by newly obtained data for updating. However, newly obtained data may not be written on the older data immediately upon being acquired. That is, a memory device 5 may likely be damaged under the vibrating condition of the vehicle. In order to avoid the damage, an incorporated memory of the controller 3 may store as much map data for overwriting as possible until the vehicle comes to be under a condition which allows safe data writing into the memory device 5. Moreover, in map data updating, older map data is not instantly deleted. Rather, it may be kept in a non-usable state (e.g., with a changed file name, etc.), instead of being completely deleted, just in case it may be needed later, for example, to deal with data communication or data writing failure. Therefore, some parts of the hard disk are always reserved for older map data.

"Map data clearance" is a process of literally deleting older map data kept in the hard disk as "insurance." Also, map data in the hard disk is rearranged such that map data on adjacent areas is stored being connected side by side. This may enhance the efficiency in data reading for navigation. In writing map data into a hard disk in order to avoid unexpected damaging of the hard disk due to abrupt vibration or other reasons, necessary data is moved from a ring shaped part of the hard disk to which map data is to be written. If a cluster in a hard disk into which map data is to be written contains necessary data, the necessary data is copied to other areas before data writing, so that only unnecessary data is contained in the cluster to be overwritten. The copied data will be used instead for subsequent processed. A continuous vacancy large enough to store the entire overwriting map data is ensured in a hard disk before data writing so that the overwriting map data can be stored connected to one another.

Automatic Maintenance Setting

This process is to set a condition for specifying a date when a maintenance process is automatically performed with respect to map data. When it becomes time which meets the designated condition, a maintenance process, including map data updating and clearance mentioned above, will be automatically conducted.

Figures 13A, 13B:
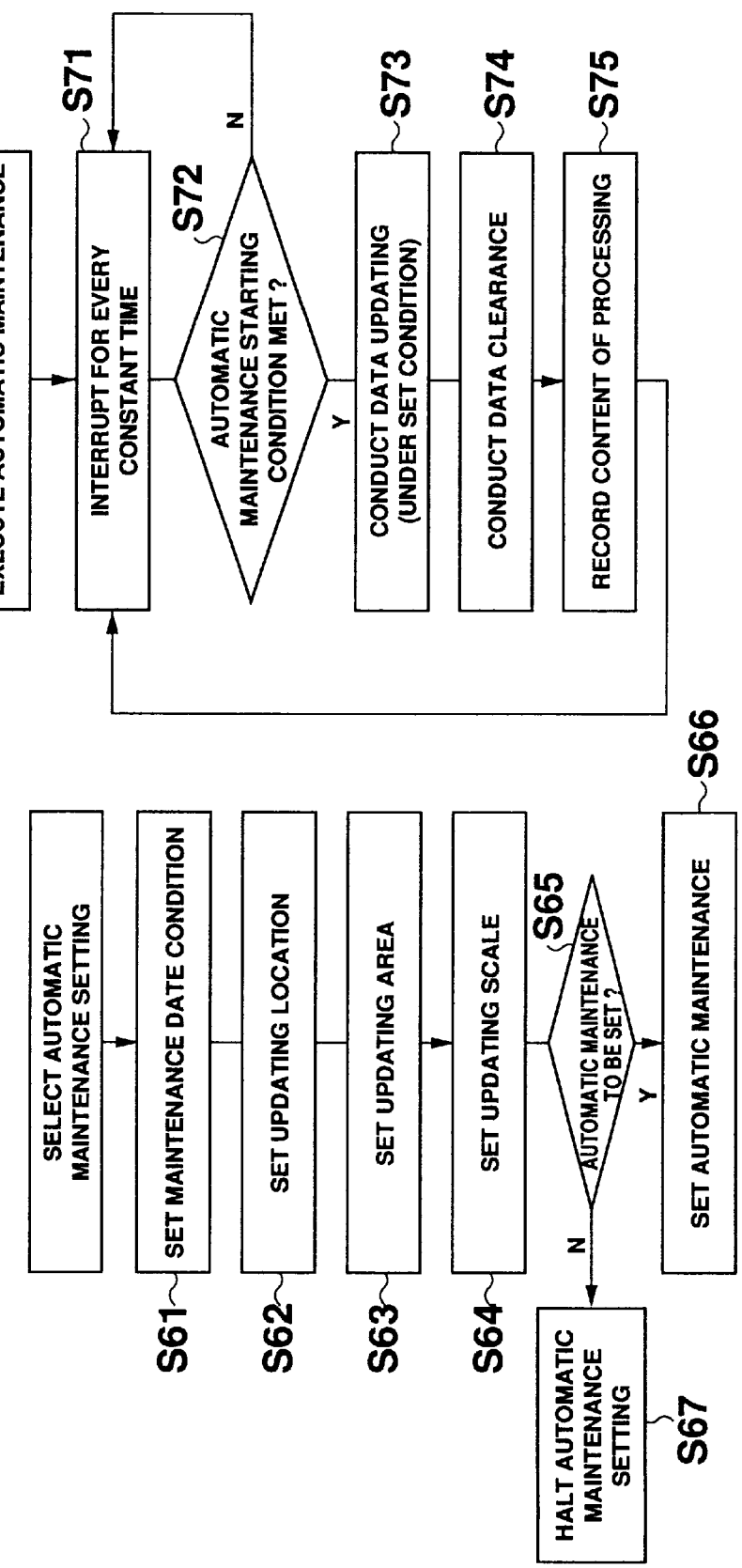
FIG. 13A is a flowchart of a process of setting "automatic maintenance;"
FIG. 13B is a flowchart of a process of executing "automatic maintenance;"

Referring to the flowchart shown in FIG. 13A, "automatic maintenance setting" is set upon selection of "automatic maintenance setting" in the application menu of FIG. 5.

Figure 14:
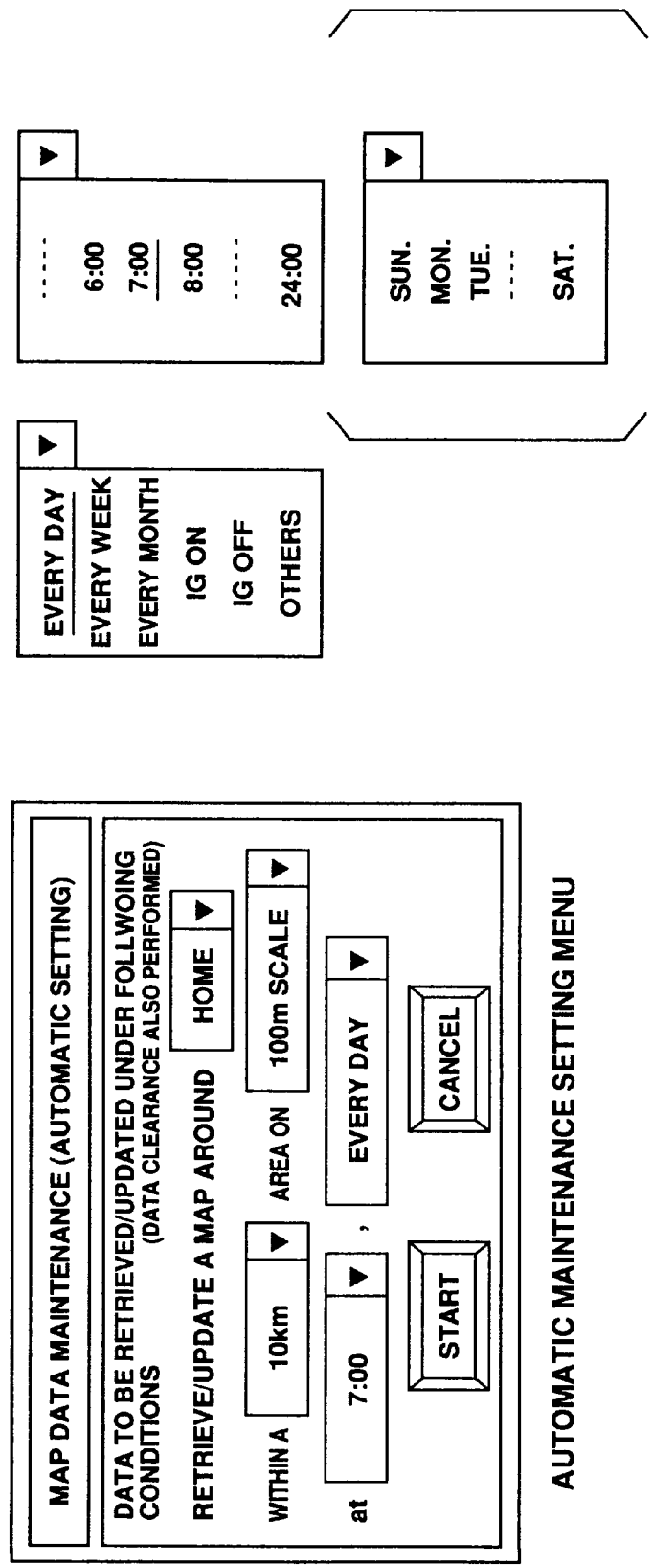
FIG. 14 is a screen image displayed for a "automatic maintenance setting" process.

In operation, the controller 3 controls the display 15 so as to display the screen image of FIG. 14. Looking at the image, the user designates a condition for specifying a maintenance date (S61), as well as designating "location," "area," and "scale" (S62, S63, S64), similar to S21, S22, S23 of FIG. 8. The user may designate these four conditions in any order. The default of "location" is "home" as a map of an area around the user's home may most needed to be constantly and automatically updated. The defaults of "area" and "scale" are determined such that map data to be selected have an appropriate data volume.

A maintenance date can be specified through various combinations of the two items shown in FIG. 14, in which one of the two is determined automatically in accordance with the other. In the example shown in the drawing, one is set at "every day," and the other is accordingly set so as to indicate a particular time of "every day." With the shown setting, a maintenance process will automatically take place at seven o'clock every day. Alternatively, if "every week" is set for the one, the other should be set so as to indicate a particular day of "every week." With "IG-ON" or "IG-OFF" for the one, nothing is specified for the other.

After the process at S61 to S64 is completed, the controller 3 asks the user to select whether or not to set automatic maintenance (S56). If the user decides to set and selects "start" in the screen image of FIG. 14, automatic maintenance is set according to the selection condition designated (S66). On the contrary, if "cancel" is selected, automatic maintenance is not set (S67).

After automatic maintenance was set, an automatic maintenance process is actually executed, following the flowchart shown in FIG. 13B. Specifically, the controller 3 carries out interruption in every predetermined time period, referring to a timer (S71), to see whether or not it is time for maintenance, or time which meets the condition specified at S61 (S72). If not, the operation process returns to S71 for another interruption. If it does, a data updating process takes place according to the condition designated at S62 to S64, using data communication with the information center 20 (S73). The data updating process to be performed here is substantially identical to that which was described with FIG. 8 except that the process at S25 in FIG. 8 is omissible. Subsequently, a data clearance process is carried out under the control of the controller 3 (S74), similar to the process of FIG. 11. When a maintenance process is completed, the controller 3 records the content of the processes just completed (S74) before the operation process returns to S71 and S72 so that relevant processes are repeatedly conducted until the next maintenance time.

Preferably, an automatic maintenance process may be applied to a system in which map data is transmitted together with traffic information. A user of this system who departs his/her home at seven thirty every morning and drives to the office, may set "home" for "location," and "every day" and "seven o'clock" as a condition for specifying a maintenance date. With this setting, map data of his/her system will be updated every morning before he/she leaves home, using map data including the latest traffic information around his/her home, so that the user is able to know, for example, which roads, if any, are under construction or closed to all vehicles before leaving home. For navigation, the controller 3 guides the user to a road without construction, referring to the traffic information obtained.

In order to enjoy the above advantage, the default of "time," corresponding to "every day" in the above example, may be set in consideration of the time when traffic information is offered. Specifically, the controller 3 records a time when the user starts using his/her vehicle every day, and obtains an average time thereof so that the default of "time" is set at the latest time when traffic information is offered earlier than the average time.

It should be noted that the same principle applied to the above case in which "every day" is set, can also be applied to a case in which other designation conditions are set.

In the above-described map data processing system according to the first preferred embodiment, updated map data may be left in different versions disorderly stored in the memory device since an updating operation is performed with respect to every sectional map data. Although map data stored in such a state has conventionally been hardly manageable by a user, the system of this invention enables easy semi-automatic management of such data.

In particular in this embodiment, all a user needs to do for the selection of updating map data is to designate "location," "area," and "scale," as described with reference to FIG. 9. With the designation set, map data is selected accordingly. In other words, map data can be selected in a simple process which does not require a user to judge as to which area or a regional unit includes the present position or destination or so.

Further, the defaults of "area size" and "scale" are determined such that map data to be selected is of uniform data volume, as described referring to FIG. 8, and presented to the user. Looking at them, the user can easily set an appropriate selection condition.

Still further, the selected map data is compared with corresponding map data stored in the information center to thereby check which is newer, and the result of the comparison is presented to the user. Looking at the result, the use can evaluate whether or not his designated selection condition is appropriate. With this arrangement, a selection condition can be easily and appropriately designated.

Although in the above description, map data is stored in the form of a collection of sectional map data each corresponding to a map of a predetermined size, as shown in FIG. 2, and a map data updating process is carried out to every sectional map data, the process may alternatively deal with map data in a different map unit, such as map data indicative of the shape of each road. In the latter case, map data will be updated when the shape of the relevant road is changed. In this case, map data to be updated provides an additional advantage in that it is lighter than in the above case in which updating is made for every sectional map data as the shapes of the roads may not greatly changed. In this case, header information occupies larger in ratio per every map data in a processing unit.

Embodiment 2

This embodiment is a modification of the first embodiment. In the following, the difference between the two embodiments will be mainly described. The major difference lies in the fact that a number of scales are collectively designated for "map data updating" in the second embodiment, while only one scale is designated once in the first embodiment.

Figure 15:
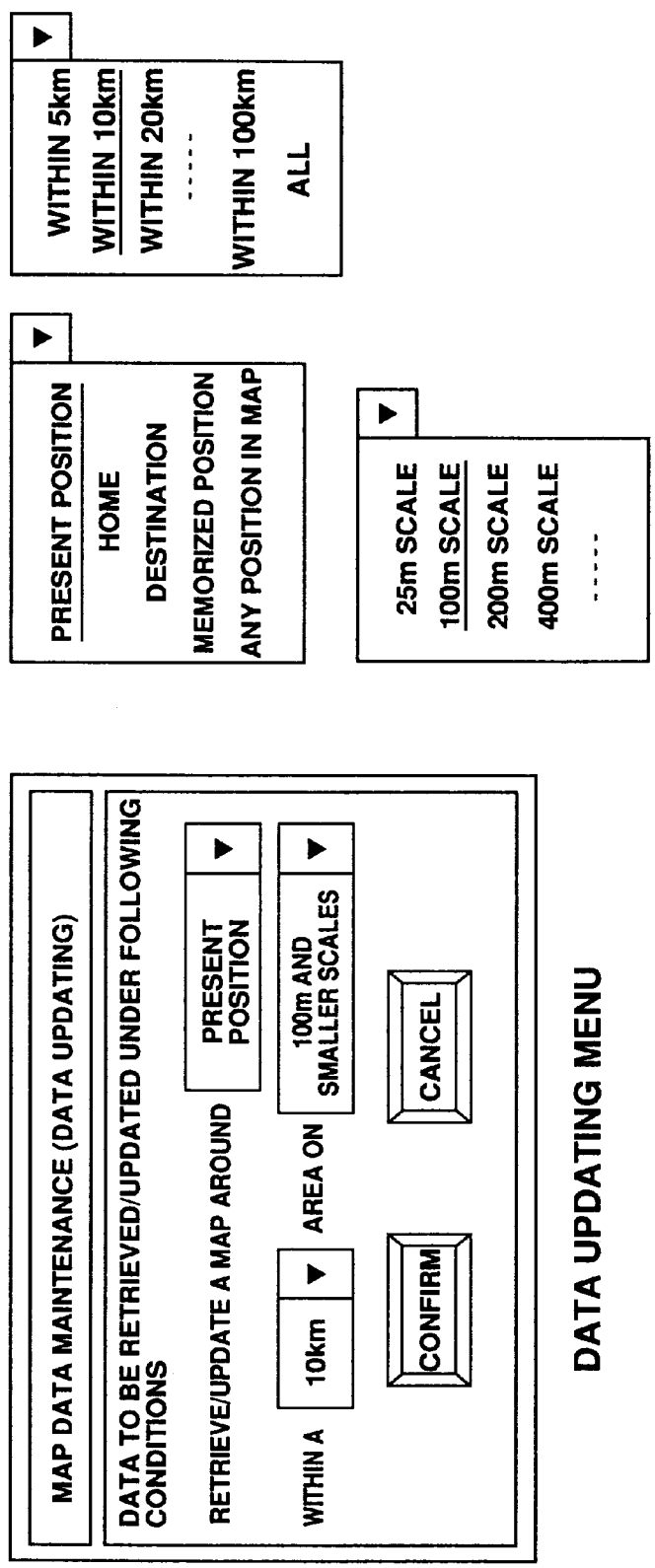
FIG. 15 is a screen image displayed for "map data updating" according to a second preferred embodiment.

In this embodiment, for "map data updating," the screen image of FIG. 15 appears in the display 15. This image corresponds to that of FIG. 9 in the first embodiment. With the image, the user is encouraged to designate a map data selection condition relating to "location," "area," and "scale," similar to the first embodiment. Only, the process concerning "scale" is different from that of the first embodiment. Specifically, with a single scale selected, map data on that scale and map data in its lower layers in the data architecture (subordinate map data) are all selected for subsequent processes. This will next be described with reference to FIG. 16.

Figure 2B:
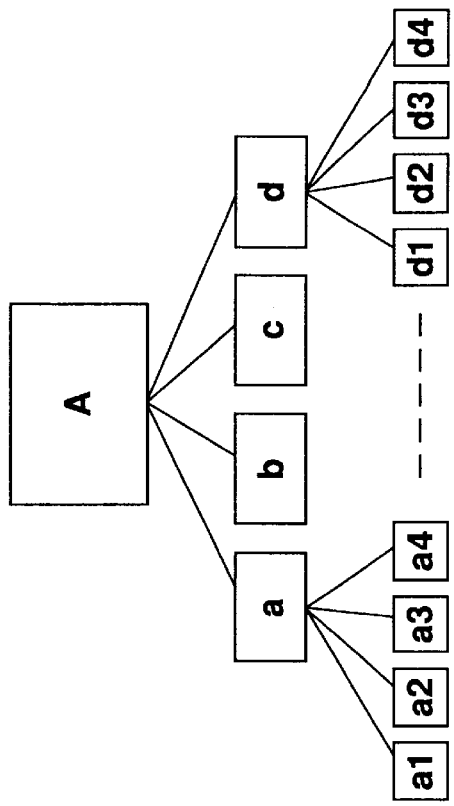
FIG. 2B shows a map data architecture.
Figure 2A:
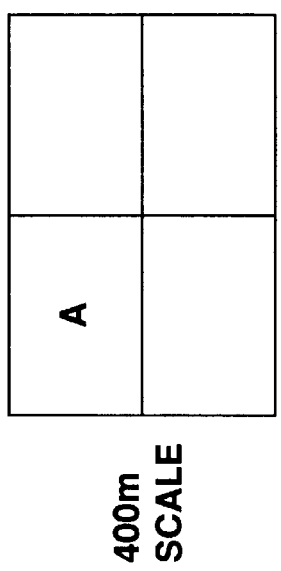
FIG. 2A shows map data for every scale.
Figure 2A:
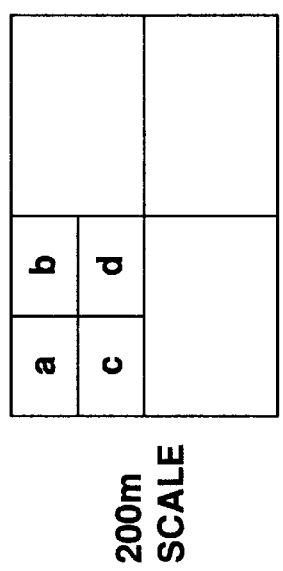
Figure 2A:
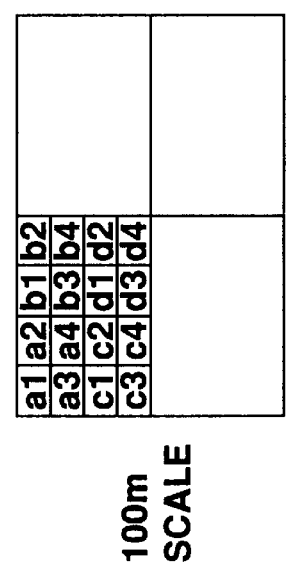
Figure 16:
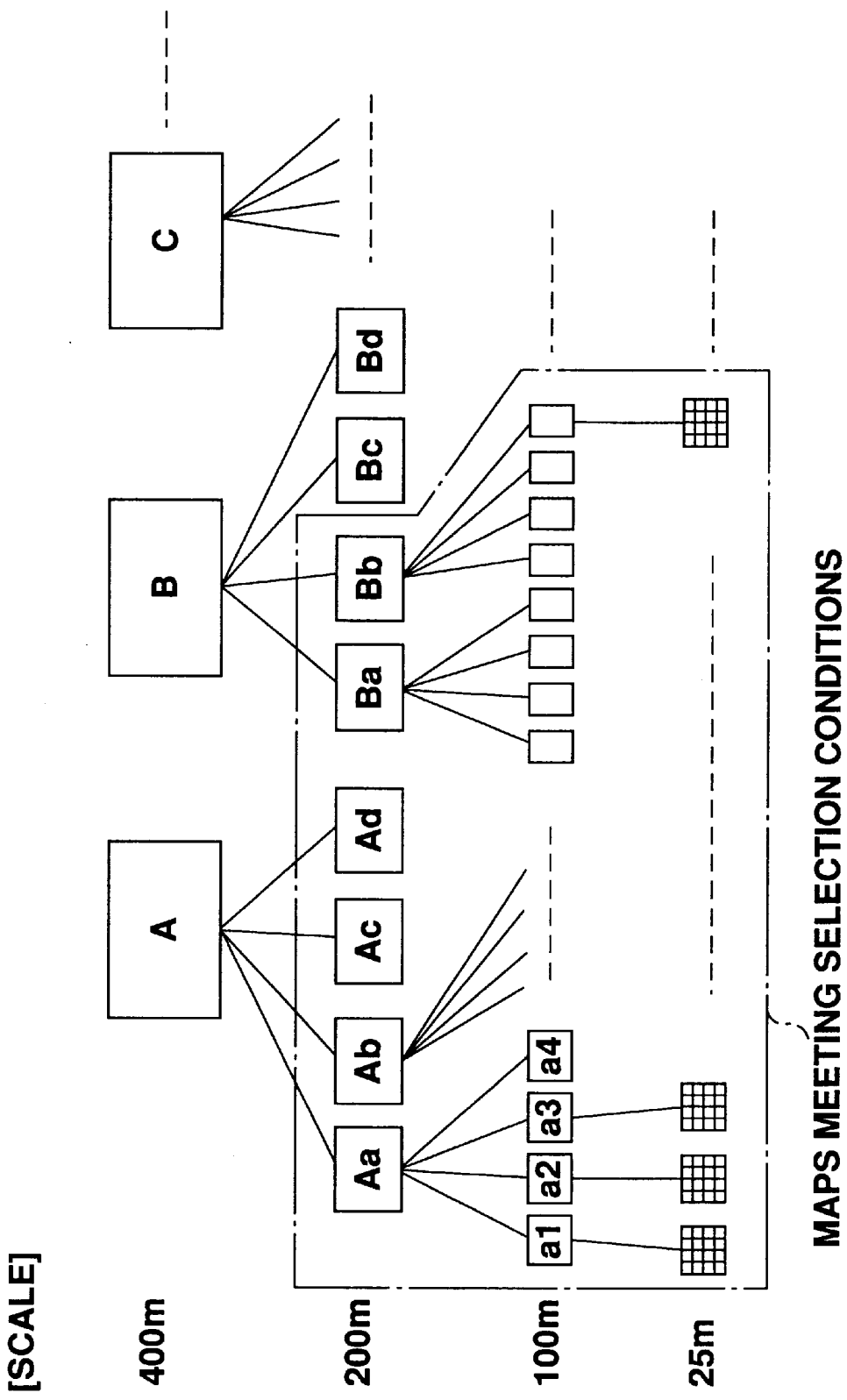
FIG. 16 is a diagram showing a map data architecture according to the second preferred embodiment.

The memory medium 5 of the terminal device 1 stores map data arranged in an architecture shown in FIG. 16, which is similar to that of FIG. 2B of the first embodiment. As seen in the drawing, certain map data accompanies a number of sectional map data on smaller scales in its lower layers.

Provide that "200 m scale," a certain location, and a certain area are designated, and maps Aa to Ad, Ba, Bb on 200 m scale meet these conditions. Besides these maps, maps on 100 m and 25 m scales in their lower layers are also selected as meet the conditions. All these maps, corresponding to those enclosed by a one-dot chain line in FIG. 16, are subjected to the following processes. In short, in response to a user's designation of "scale," map data on that scale and its subordinate map data is collectively selected.

In addition, header information of map data is different from that of the first embodiment. Header information of this embodiment, shown in FIG. 17, includes an additional item, or an associated updating date. "Associated updating date" of certain map data indicates the latest date when any of its subordinate map data was updated.

An updating date and an associated updating date included in header information are changed according to the following rules (1) and (2), respectively.

(1) Updating date

When some map data is updated, its updating date is changed to the date when the updating was made. Accompanying this, updating dates of its subordinate map data are also changed.

When map A (400 m scale) in FIG. 16 is updated, the updating date of map A is changed. Also, updating dates of its subordinate map data, i.e., four maps Aa to Ad (200 m scale), sixteen maps (100 m scale), and 256 (16×16) maps (scale 25 m), are also changed. Note that, if any subordinate map data has already acquired a more recent updating date than the updated updating date of map A, the former naturally remains unchanged.

Figure 18:
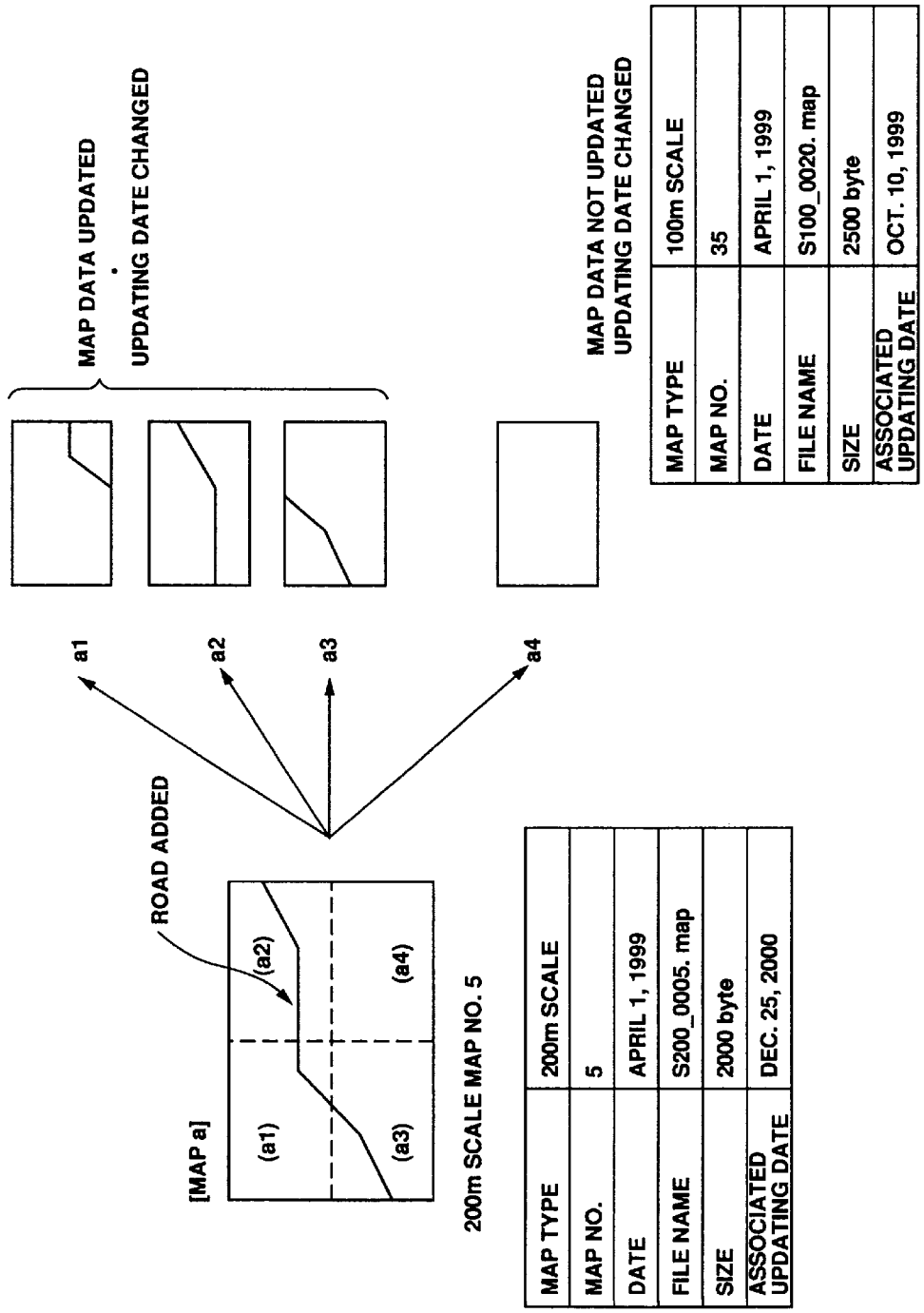
FIG. 18 is a diagram illustrating a process of updating an updating date indicated in the header part of map data according to the second preferred embodiment.

A specific example of rewriting an updating date will be described referring to FIG. 18.

Provide that "map a" (200 m scale) is updated on Apr. 1, 1999 because of addition of a new road as shown in the drawing. The updating date of "map a" is changed to Apr. 1, 1999. In addition, as described earlier with reference to FIG. 16, maps a1 to a4 are also subjected to processing. In actuality, maps a1 to a3 are updated and their updating dates are rewritten. On the other hand, map a4 is not updated as the new road does not pass through the area covered by map a4. Still, the updating date of map a4 is updated to Apr. 1, 1999, following the rule (1), because "map a" on its upper layer has been updated.

(2) Associated Updating date

An "associated updating date" is the latest date when any subordinate map data was updated, as described earlier. When certain map data is updated, the associated updating dates of map data on its upper layers are changed.

Referring to FIG. 16, provide that one of the sixteen maps (25 m scale) which belongs to map a1 (100 m scale) is updated to obtain the most recent updating date among the sixteen. The "associated updating dates" of the maps in its direct upper layers, namely maps a1 (100 m scale), Aa (200 m scale), A (400 m scale), are changed accordingly. On the other hand, the "associated updating dates" of maps which are not in direct upper layers of that map, namely maps a2, a3, a4, Ab, Ac, Ad, are not changed.

Figure 19:
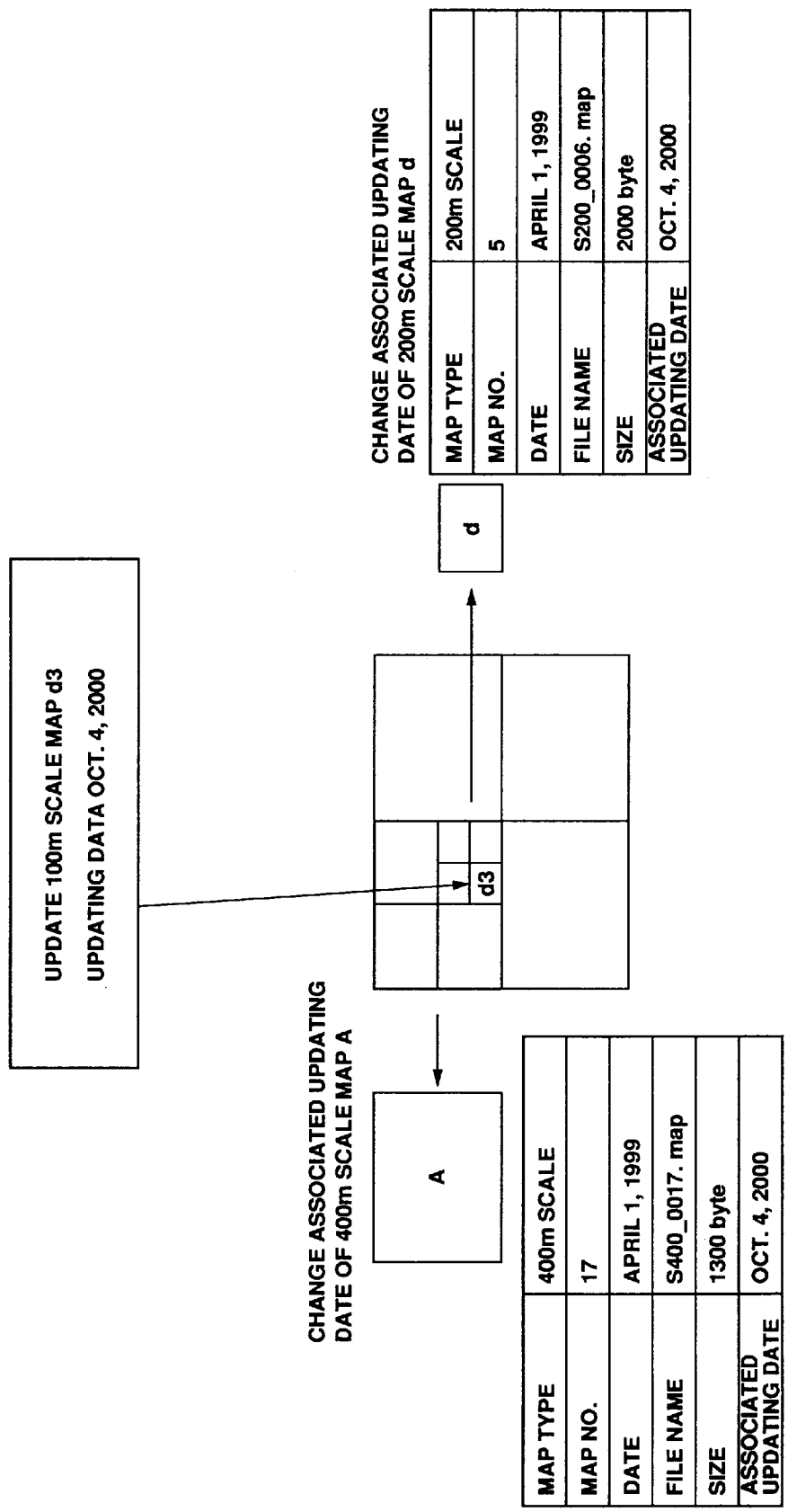
FIG. 19 is a diagram illustrating a process of updating an associated updating date indicated in a header part of map data according to the second preferred embodiment.

As a specific example of the above, referring to FIG. 19. provide that map d3 (100 m scale) is updated on Oct. 14, 2000. The associated updating dates of map d (200 m scale) and map A (400 m scale) are changed to Oct. 14, 2000.

As described above, in this embodiment, upon a user's designation of "scale," map data on that scale and its subordinate map data is all collectively selected to be processed thereinafter. Due to rule (1), map data in lower layers always have an equal or more recent updating date than those in higher layers. Moreover, an associated updating date of certain map data indicates the latest updating date among those of its subordinate map data, following rule (2). Therefore, reference to the header information of the interest map data can tell "the range of updating dates" of the interest map data and its subordinate map data (?).

Knowledge of "the range of updating dates" is useful when comparing updating dates. Here, the information center 20 of this embodiment holds map data stored in an architecture similar to that described above. Since the map data held by the center 20 are always the latest, reference to the header information of the map data on the center 20 can tell the range of updating dates defined by the latest map data. When updating dates are compared between corresponding map data held on the vehicle side and the center side by comparing header information thereof, chronological order between them is known. Further, comparison of associated map dates proves chronological order of their subordinate map data. If associated updating dates between corresponding map data on the vehicle side and on the center 20 side are proved to be the same through comparison, it is known that the vehicle has the latest map data. Therefore, header information of their subordinate map data needs not to be examined. On the other hand, if the associated updating date of map data on the center 20 side is proved to be more recent, the header information of their subordinate map data also need to be compared.

It should be noted that the above principle is equally applicable to a case in which a medium 11, rather than the information center 20, is employed as a source of comparing date.

Referring to the flowchart of FIG. 20, a process of setting updating map data for "map data updating" will be described. The flowchart shows the details of the process held at S24 of FIG. 8, in which the advantage of associated updating dates is utilized.

After designation of "location," "area," and "scale" at S21 to S23 of FIG. 8, the controller 3 requests the information center 20 to transmit the header information of all map data which meet the selection condition, including not only map data on the designated scale but also those in its subordinate layers (S81). In response to the request, the center controller 22 retrieves relevant header information from the center map data storing device 26, and sends it to the requesting vehicle. The vehicle receives the header information, using the communication controller 7, under the control of the controller 3.

The controller 3 initially sets the map data on the designated scale alone as candidate updating map data (S82). At this stage, the map data belonging to lower layers than the layer of the designated scale is not set as the candidate yet.

Then, the controller 3 chooses one of the candidates and compares the updating date thereof and that of corresponding map data supplied by the center 20 (S83). The comparison proves chronological order between the two data items (S84) If the date of the data from the center 20 is more recent, the chosen candidate map data is registered as an "updating map data" (S85). If otherwise, the operation process skips S85, and proceeds to S86, as the chosen map data does not need to be updated.

At S86, the associated updating date of the chosen map data is compared with that of the corresponding data from the center 20 to see which is more recent (S87). If the associated updating date of the data from the center is more recent, the necessity of updating the subordinate map data of the chosen map data should be considered. Therefore, map data in a one-stage lower layer of the chosen map data is additionally set as candidate updating map data (S88). If otherwise at S87, it means that subordinate map data of the chosen map data have already been updated. Therefore, the operation process skips S88, and proceeds to S89. At S89, the controller 3 verifies that no candidate updating map data is left without being processed at S83 to S88 (S89). If some are left, the operation process returns to S83 to repeat the above processes with respect to the remaining candidates. If none, the operation process is completed.

The above process of FIG. 20 will be described using a specific example, referring to FIG. 16.

Figure 20:
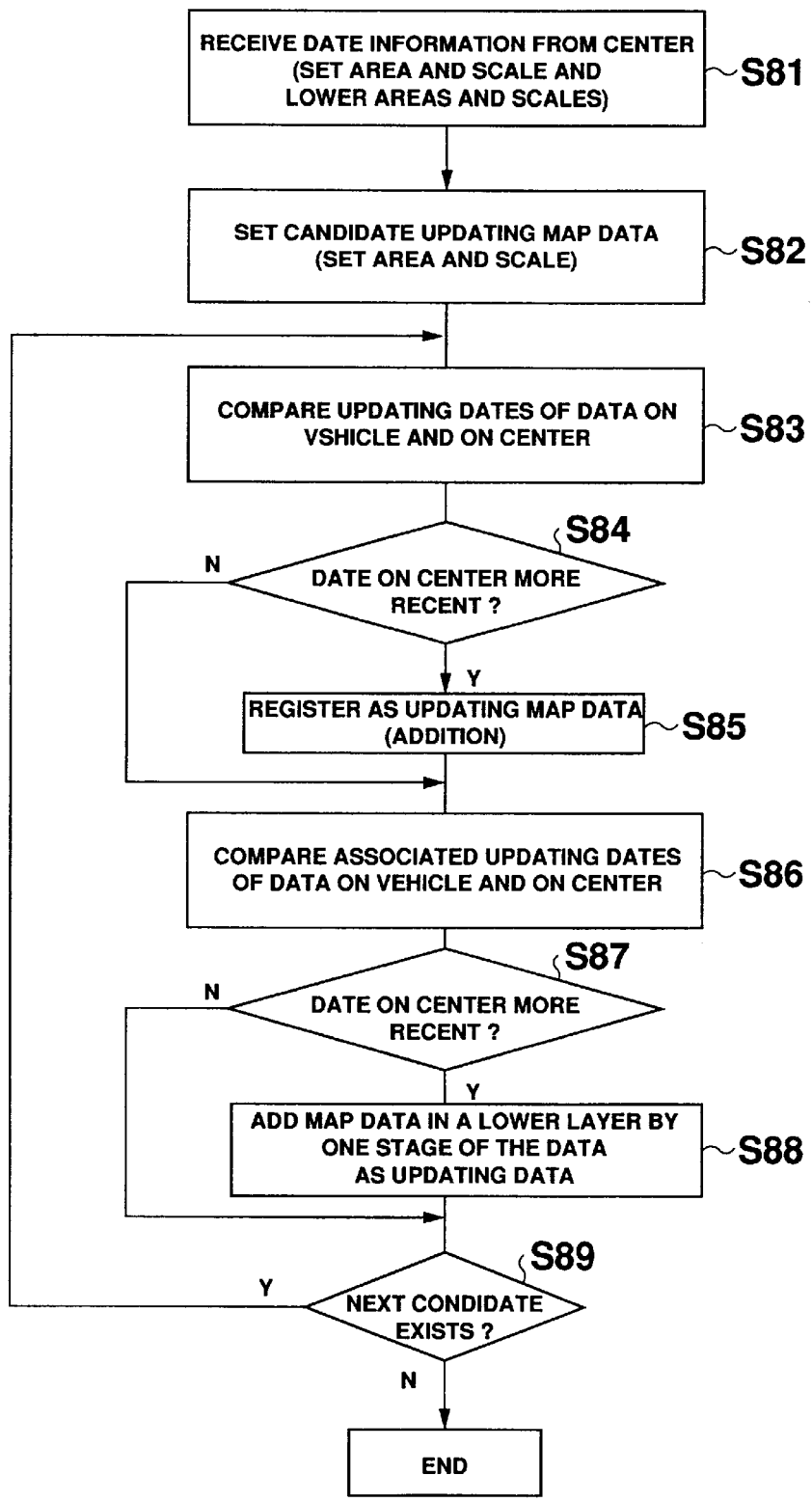
FIG. 20 is a flowchart of a process of setting updating map data in a process of "map data updating" according to the second preferred embodiment.

When maps enclosed by the one-dot chain line in FIG. 16 are selected according to the designated "location," "area," and "scale," the controller 3 on the vehicle side receives header information of all these maps from the center 20 at S81 in FIG. 20. Then, maps Aa to Bb (200 m scales) are set as candidate updating map data at S82, and one of them, e.g., map Aa, is chosen to be compared with the corresponding date informed by the center 20 at S83. If the informed date is proved to be more recent (S84), map Aa is registered as updating map data (S85). Subsequently, the associated updating date of map Aa is compared with corresponding date informed by the center 20 (S86). If the informed date is proved to be more recent (S87), map data in a one-stage lower layer of the chosen map, namely, maps a1 to a4, is added as candidate updating map data (S88), and subjected to the processes at S83 to S88.

After updating map data for "map data updating" is determined through the processes of FIG. 20, the operation process proceeds to S25 of FIG. 8, similar to the first embodiment, where the determined updating map data is displayed in the display 5. Looking at the display, the user can observe map data on a desired scale, while switching scales. Subsequent processes are identical to those which take place after S26 in the first embodiment.

Note that in the process of FIG. 20, described above, data communication is used. A process in which a medium 11 is used instead, is substantially equal to this process, and associated updating dates are similarly utilized. In the latter, however, all map data is collectively registered as candidate updating map data for examination of their newness. Specifically, map data on the largest scales is all set as candidate updating map data at S82 of FIG. 20, followed by identical processes to those using header information obtained from the center 20, only using header information stored in the medium 11.

An associated updating date is also utilized for "map data confirmation" in this embodiment. The principle applied to a confirmation process is the same as that is applied to date comparison using a medium 11, described above.

Similar to the first embodiment, in which defaults of "location," "area," and "scale" are set, these defaults are also set in this embodiment. The setting is achieved in this embodiment in a substantially same manner as that in the first embodiment, except that a number of scales are collectively designated. With consideration on this difference, defaults of "area" and "scale" are determined such that map data to be selected has a predetermined data volume.

Further, in this second embodiment, judgement process of map newness is simplified utilizing an associating updating date. Therefore, for precise judgement, it is preferable that all map data stored in the medium 5 is periodically checked, using the medium 11. Specifically, updating dates of map data are compared one by one, similar to the first embodiment, without utilizing associated updating dates, and map data are processed as necessary based on the comparison result.

In addition to the above, "map data clearance" and "automatic maintenance setting" are carried out similar to the first embodiment except that a number of scales are collectively designated in an "automatic maintenance setting" process, similar to "map data updating."

As described above, the map data processing system of this embodiment can facilitate a user's map data management, and in particular, setting of an appropriate condition for selecting updating map data.

What is claimed is:

1. A map data processing device mounted on a terminal device having terminal map data storing means storing a map data group, comprising;

designation means for designating a desired location, a desired area size, and a desired map scale;

selection means for selecting from the map data group stored in the terminal map data storing means, map data on the map scale designated covering the location designated and the area size designated;

communication means for communicating with an information center, the center having center map data storing means storing a latest map data group;

comparison means for comparing the chronological order of the map data selected and corresponding map data stored in the center map data storing means using the communication means; and display means for displaying the result of comparison so that a user acknowledges the result.

2. A map data processing device according to claim 1, further comprising map data updating means for setting updating map data from the map data selected by the selection means based on the result of comparison made by the comparison means, and for updating the updating map data using corresponding map data stored in the center map data storing means using the communication means.

3. A map data processing device according to claim 2, wherein the map data updating means sets map data which is older than the corresponding map data stored in the center map data storing means as updating map data.

4. A map data processing device according to claim 1, wherein the designation means designates a candidate area size and a candidate scale size that define map data within a predetermined data volume, and presents the candidate area size and the candidate scale to the user.

5. A map data processing device according to claim 4, wherein the predetermined data volume is determined based on the communication capacity of the communication means such that map data having the predetermined data volume is externally obtained within a predetermined time period.

6. A map data selection supporting device for supporting an operation of selecting desired map data from a map data group, comprising:

map data storing means for storing the map data group;

location designation means for designating a desired location;

area designation means for designating a desired area size;

scale designation means for designating a desired map scale; and selection means for selecting, from the map data group, map data at the map scale designated covering the location designated and the area size designated, wherein the scale designation means designates a candidate map scale based on the area size designated by the area designation means such that the selection means selects map data within a predetermined total data volume, and the candidate map scale designated is recommended to a user.

7. A map data selection supporting device for supporting an operation of selecting desired map data from a map data group, comprising:

map data storing means for storing the map data group;

location designation means for designating a desired location;

area designation means for designating a desired area size;

scale designation means for designating a desired map scale; and selection means for selecting, from the map data group, map data at the map scale designated covering the location designated and the area size designated, wherein the area designation means designates a candidate area size based on the scale designated by the scale designation means, such that the selection means selects map data within a predetermined total data volume, and the candidate area size designated is recommended to a user.

8. A map data processing system, comprising:

a terminal device having terminal map data storing means storing a map data group;

an information center connected to the terminal device via communication means and comprising center map data storing means storing a group of latest map data;

the terminal device including designation means for designating a desired location, a desired area size, and a desired map scale;

selection means for selecting from the map data group stored in the terminal map data storing means, map data at the map scale designated covering the location designated and the area size designated;

comparison means for comparing the chronological order of the map data selected and corresponding map data stored in the center map data storing means; and display means for displaying the results of comparison so that a user acknowledges the result.

* * * * *

UNITED STATES PATENT AND TRADEMARK OFFICE
CERTIFICATE OF CORRECTION

PATENT NO. : 6,075,467
DATED : June 13, 2000
INVENTOR(S) : Yuji NINAGAWA

It is certified that error appears in the above-indentified patent and that said Letters Patent is hereby corrected as shown below:

On the Title Page, Item [73], in the Assignee, line 2, "Aichi-ken" should read --Toyota--.

On the Title Page, Item [57], in the Abstract, line 15, "set" should read --sets--.

In Claim 1, col. 18, line 27, "comprising;" should read --comprising:--.

Signed and Sealed this

Twenty-seventh Day of March, 2001

Attest:

NICHOLAS P. GODICI

Attesting Officer

Acting Director of the United States Patent and Trademark Office